W. H. SIEFER.
COUPLING.
APPLICATION FILED MAY 22, 1919.
1,382,324.
Patented June 21, 1921.
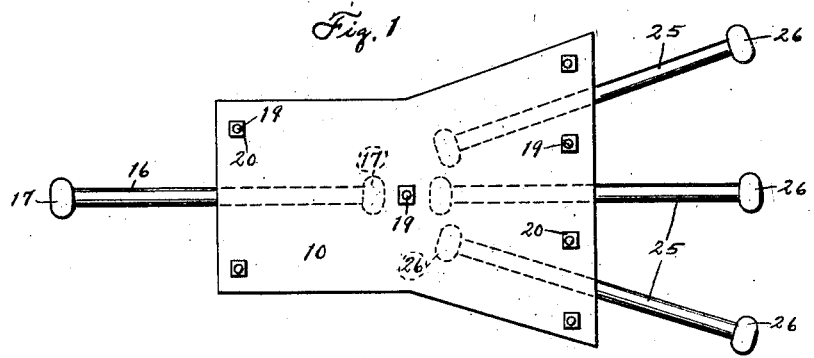
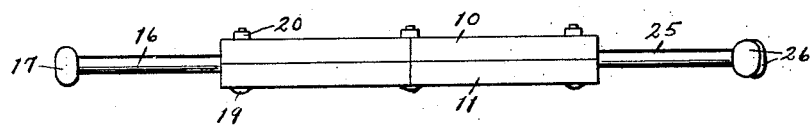
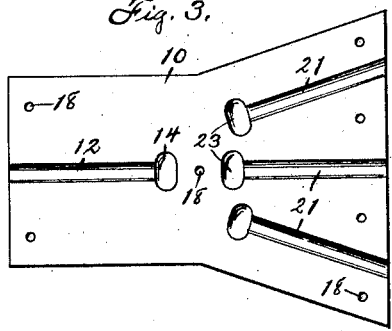
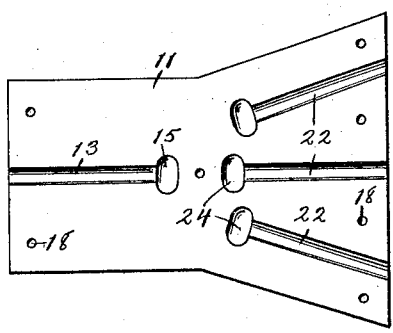
INVENTOR:
W. H. SIEFER
By Earl M. Sinclair
Att'y.

UNITED STATES PATENT OFFICE.

WILLIAM HENRY SIEFER, OF WAYLAND, IOWA.

COUPLING.

1,382,324.   Specification of Letters Patent.   Patented June 21, 1921.

Application filed May 22, 1919. Serial No. 298,870.

*To all whom it may concern:*

Be it known that I, WILLIAM H. SIEFER, a citizen of the United States of America, and resident of the town of Wayland, Henry county, Iowa, have invented a new and useful Coupling, of which the following is a specification.

The object of this invention is to provide an improved coupling for use in transmitting power from a single prime mover to a multiplicity of follower devices.

A further object of this invention is to provide improved means for transmitting motion from one reciprocating part to a multiplicity of reciprocating parts.

My invention consists in the construction, arrangement and combination of elements hereinafter set forth, pointed out in my claim and illustrated by the accompanying drawing, in which—

Figure 1 is a side elevation illustrating my improved multiple coupling device. Fig. 2 is an edge view of the same. Figs. 3 and 4 are inner face views of the respective clamping plates.

In the construction of the device as shown two mating or counterpart clamping plates 10, 11 are employed. On its inner face the plate 10 is formed with a central longitudinal groove 12 opening to one end of said plate, and the counterpart plate 11 is formed with a like groove 13. The grooves 12, 13 extend a suitable distance lengthwise of the plates and terminate in recesses 14, 15, which are of greater depth than said grooves and expanded laterally. The grooves 12, 13 correspond in width to the diameter of a coupling pin such as 16, and each of said grooves is semi-circular in cross-section and adapted to receive said pin. A knob 17 on one end of the coupling pin 16 is adapted to be received within the recesses 14, 15 of the clamping plates, so that said plates may be clamped together face to face, with said pin in the grooves 12, 13. and the location of the knob 17 in the recesses, together with frictional contact of the plates upon the pin, will prevent withdrawal of the latter by endwise movement. The clamping plates 10, 11 are formed with registering bolt holes 18 of any suitable number, through which may be mounted bolts 19, secured by nuts 20, to clamp the plates firmly together. The pin 16 may have a knob 17 on each end so that either end may be inserted between the plates, preferably about half of the pin being so received, and half projecting endwise from the plates. The opposite end of the coupling pin 16 is adapted to be suitably connected to the connecting rod or other reciprocating member of an engine or other prime mover, not shown.

The clamping plates 10, 11 are also formed on their inner faces with a multiplicity of grooves 21, 22, terminating in recesses 23, 24, said grooves 21, 22 opening to the opposite end of the plates from the grooves 12, 13. The grooves 21, 22 correspond, preferably, in size and shape with the grooves 12, 13, and the recesses 23, 24 with the recesses 14, 15, and said grooves 21, 22 and recesses 23, 24 are adapted to receive coupling pins 25, terminating in knobs 26, which coupling pins preferably are counterparts of the pin 16, and may be used interchangeably therewith and with each other. The grooves 21, 22 and pins 25 may be of any desired number and be arranged in any suitable manner, but I have here shown them as three in number, the intermediate grooves 21, 22 being in line with the grooves 12, 13 and the others arranged on slightly divergent lines on each side of the center of the plates. The coupling pins 25 are adapted to be connected suitably to pump rods or other reciprocating members of follower devices, so that a multiplicity of such follower devices may be operated, through the medium of the clamping plates and coupling pins, from a single prime mover. The clamping plates 10, 11 may be of any suitable size and shape, being here shown as substantially rectangular at one end, the end having the single groove, and substantially trapezoidal at the other end, the end having the multiplicity of grooves, the side margins of such end portions flaring outwardly to correspond substantially to the outward trend of the outermost grooves. Any other arrangement may be employed, and the plates may be much wider at one end to accommodate a greater number of grooves and coupling pins.

I claim as my invention—

A coupling device, comprising counterpart one-piece clamping plates, each of said plates being wider at one end than the other, each of said plates being formed on its inner face with a longitudinal groove terminating in a transverse recess and opening to one end of said plate, and also with a longitudinal groove in line with and spaced from the first groove and opening to the opposite end of the plate and also formed at its inner end with a transverse recess, each of said plates also being formed at its wider end with end-opening grooves arranged on opposite sides of the longitudinal groove and at angles thereto and also terminating in transverse recesses, headed coupling pins adapted to be mounted in the grooves of said plates and project therefrom, each of said pins being formed with a head received in the recesses of said grooves, said plates also being formed with bolt holes on each side of each of said grooves, and between the recesses of the longitudinal grooves, and clamping bolts mounted through said bolt holes.

Signed at Wayland, in the county of Henry and State of Iowa, this 8th day of May, 1919.

WILLIAM HENRY SIEFER.

Witness:
H. E. DAVIES.